US011907321B2

(12) United States Patent
Turner et al.

(10) Patent No.: US 11,907,321 B2
(45) Date of Patent: Feb. 20, 2024

(54) OPERATOR SETTINGS FOR NATURAL LANGUAGE SEARCH AND FILTERING ON A WEB SERVICE PLATFORM FOR DISTRIBUTED SERVER SYSTEMS AND CLIENTS

(71) Applicant: Trovata, Inc., San Diego, CA (US)

(72) Inventors: Brett Turner, San Diego, CA (US); Joseph Drambarean, Encinitas, CA (US); Francisco PerezLeon, Richmond, CA (US); Ryan Voris, San Diego, CA (US); Aqeel Gunja, Naperville, IL (US)

(73) Assignee: TROVATA, INC., San Diego, CA (US)

( * ) Notice: Subject to any disclaimer, the term of this patent is extended or adjusted under 35 U.S.C. 154(b) by 0 days.

(21) Appl. No.: 17/072,940

(22) Filed: Oct. 16, 2020

(65) Prior Publication Data

US 2021/0117486 A1     Apr. 22, 2021

Related U.S. Application Data

(60) Provisional application No. 62/923,349, filed on Oct. 18, 2019.

(51) Int. Cl.
*G06F 16/958* (2019.01)
*G06F 16/953* (2019.01)
*G06F 16/951* (2019.01)

(52) U.S. Cl.
CPC .......... *G06F 16/958* (2019.01); *G06F 16/951* (2019.01); *G06F 16/953* (2019.01)

(58) Field of Classification Search
CPC ..... G06F 16/958; G06F 16/953; G06F 16/951
See application file for complete search history.

(56) References Cited

U.S. PATENT DOCUMENTS

| | | | |
|---|---|---|---|
| 6,411,974 B1 * | 6/2002 | Graham | G06F 16/30 715/202 |
| 7,243,156 B2 * | 7/2007 | Hahn | G06F 16/958 709/231 |
| 7,835,976 B2 | 11/2010 | Hagerman et al. | |
| 8,099,354 B2 | 1/2012 | Hagerman et al. | |
| 8,190,504 B1 | 5/2012 | Stolz et al. | |
| 8,583,053 B1 | 11/2013 | Mahbod et al. | |
| 8,676,689 B1 | 3/2014 | Whelan | |
| 8,768,809 B1 | 7/2014 | Cole et al. | |

(Continued)

FOREIGN PATENT DOCUMENTS

WO     2013011545 A1     1/2013

OTHER PUBLICATIONS

10 Tips for Moving from Static Budgets to Rolling Forecasts, Vena Solutions.

(Continued)

*Primary Examiner* — Hope C Sheffield
(74) *Attorney, Agent, or Firm* — Rowan TELS LLC

(57) ABSTRACT

A system utilizing a web integration service to pull data from disparate computer server systems, and a normalizing module to generate a normalized data set utilized by an indexing module across a de-coupling boundary to generate a search index. An outflow module utilizes results from the search index and hierarchical grouping control structures to generate customized data flows to client devices with improved performance.

20 Claims, 11 Drawing Sheets

(56) References Cited

U.S. PATENT DOCUMENTS

| | | |
|---|---|---|
| 2003/0182230 A1 | 9/2003 | Pessin |
| 2004/0021659 A1 | 2/2004 | Peercy et al. |
| 2004/0153504 A1 | 8/2004 | Hutchinson et al. |
| 2005/0018784 A1 | 1/2005 | Kurobe et al. |
| 2006/0047588 A1 | 3/2006 | Lal et al. |
| 2006/0095367 A1 | 5/2006 | Iverson |
| 2008/0098014 A1* | 4/2008 | Eichstaedt ......... H04N 21/4143 |
| 2009/0276419 A1 | 11/2009 | Jones et al. |
| 2010/0131424 A1 | 5/2010 | Moséet al. |
| 2012/0123872 A1 | 5/2012 | Chiu et al. |
| 2013/0159832 A1* | 6/2013 | Ingargiola ............ G06Q 40/00 715/220 |
| 2013/0262394 A1 | 10/2013 | Kumarasamy et al. |
| 2015/0032506 A1 | 1/2015 | Kim et al. |
| 2015/0082218 A1* | 3/2015 | Affoneh ................ G06F 9/451 715/771 |
| 2015/0348067 A1 | 12/2015 | Deegan et al. |
| 2016/0019504 A1 | 1/2016 | Ghosh |
| 2017/0053344 A1 | 2/2017 | Yaplee et al. |
| 2017/0103468 A1 | 4/2017 | Orsini et al. |
| 2017/0178154 A1 | 6/2017 | Wegener et al. |
| 2017/0236119 A1 | 8/2017 | Kamensky et al. |
| 2017/0323394 A1 | 11/2017 | Campione |
| 2018/0130130 A1 | 5/2018 | Dechu et al. |
| 2018/0158146 A1 | 6/2018 | Turner et al. |
| 2021/0142399 A1 | 5/2021 | Joliveau |
| 2021/0248151 A1* | 8/2021 | Kadel ................... G06Q 10/08 |
| 2022/0147895 A1 | 5/2022 | Katz et al. |

OTHER PUBLICATIONS

Financial Forecasting Guide—Learn to Forecast Revenues, Expenses, Corporate Financial Institute.

Decoupling Interfaces from Implementation—Using Separated Interfaces by Gervasio (Year: 2012).

* cited by examiner

Tag Creation

Settings ⓘ

Tag name: Payroll (7/30)
Tag description: All payroll transactions (24/500)
☑ Auto-Tag

⎱ 204

Tag Type ⓘ

Parameter-Based ─── Tag-Based

Search: "adp" "payroll"

Type: Debit ⊗ | Institution: Silicon Valley Bank ⊗ | Currency: USD ⊗

From: Any Date   To: Any Date   ▦

⎱ 206

208 ↗
Credit/Debit ▷
  Debit
Institutions ▷
  Silicon Valley Bank
Accounts ▷
Currencies ▷
  USD

Preview 51 of 51 Transactions

| Date | Description | Bank | Account Number | | |
|---|---|---|---|---|---|
| Jun 28, 2019 | ADP PAYROLL FEES ADP - FEES 10... | Silicon Valley Bank | ****1150 | | |
| Dec 14, 2019 | ADP PAYROLL FEES ADP - FEES 10... | Silicon Valley Bank | ****1150 | ($ 52.70) | USD |
| Sep 14, 2018 | ADP PAYROLL FEES ADP - FEES 10... | Silicon Valley Bank | ****1150 | | |
| Jul 27, 2018 | ADP PAYROLL FEES ADP - FEES 10... | Silicon Valley Bank | ****1150 | ($ 838.70) | USD |

⎱ 210

⎱ 214

[ Cancel ]  [ Save ]

FIG. 2B

OPERATOR SETTINGS FOR NATURAL LANGUAGE SEARCH AND FILTERING ON A WEB SERVICE PLATFORM FOR DISTRIBUTED SERVER SYSTEMS AND CLIENTS

CROSS REFERENCE TO RELATED APPLICATIONS

This application claims priority and benefit under 35 USC 119(e) to U.S. application Serial No. U.S. 62/923,349, filed on Oct. 18, 2019, the contents of which are incorporated herein by reference in their entirety.

TECHNICAL FIELD

The subject matter described herein relates to web-based service platforms, and more particularly to a system and method for autonomous and semi-autonomous data flow and transformation from disparate computer server systems to client devices.

BACKGROUND

Functions performed in enterprise resource tracking, planning, and allocation have many interdependencies and they generally operate separately from one another as the skills required to perform the duties of each function are different. As a result, the systems used by each function, and the many work flows to produce desired results for each, can be disparate and involve manual processes. For example, most companies today still rely heavily on spreadsheets for many core or critical tasks.

Conventional platforms or processes for enterprise resource allocation and planning generate a forecast, which is what a company estimates as its resource availability in the future, that is derived from various sources and compiled by its staff. This process is labor intensive. Once the data is gathered, it is manually input or imported into spreadsheets (i.e., Microsoft Excel® or Google Sheets®, or the like), often within a model that is manually created, configured and maintained. A considerable amount of effort and analysis is often required and expended in computing the forecast using a spreadsheet. Once the forecast is determined, it then must be output to certain reports and communicated to managers for review and decision making.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 2B depicts tagging logic 202 in accordance with one embodiment.

DETAILED DESCRIPTION

Figure 1:
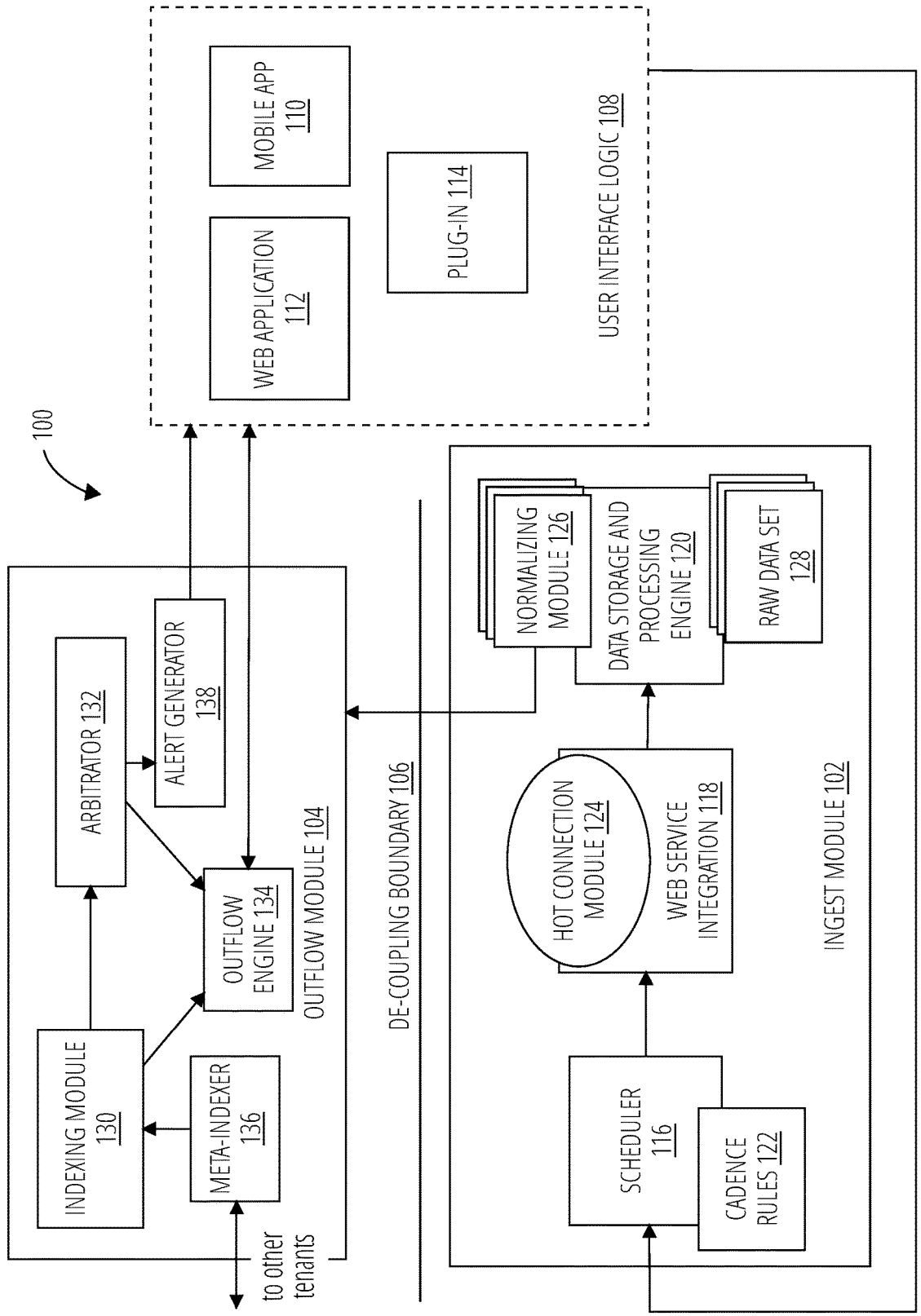
FIG. 1 depicts a distributed computing platform 100 in accordance with one embodiment.

Embodiments of a distributed computing platform are disclosed to seamlessly automate operational tasks across functional areas within an enterprise. The platform implements a scalable online system for data ingest, indexing, and outflow, with performance-enhancing rate matching between each stage.

The disclosed system may be configured with named hierarchical filters. As new transactions occur, indexing is applied across a decoupling boundary, and hierarchical filters (called 'tags') are applied post-index for enhanced performance and customization without necessitating the instrumentation of each transaction.

Conventional indexing approaches write fields into each transaction that matches a condition (a 'tag'). "Tag" refers to a label associated with a filter condition. An example of a filter condition is a Structured Query Language or Boolean logic setting. An example of a tag (the format is just an example) is: September Large Transactions→"amount >\$100 AND 9/1/2019←date←9/30/2019". Adding fields into each transaction degrades performance as edits or changes to the tag or any aspect of the parameters utilized by the tag compels the system to scan through the entirety of the index and make changes to each record utilizing the tag, and then re-index.

The disclosed system exhibits improved performance by de-coupling indexing from the parametric constraints of tagging and thus may better match indexing performance with a rate of data ingest and/or data outflow. The disclosed technique enabled faster searching and more effective storage of data than previous methods, and thus provide a specific improvement to the operation of distributed computing platforms, and improves their capabilities for rate-matching inflows to indexing.

The disclosed systems provide increased flexibility, faster search times, and potentially reduced memory requirements for data storage.

Multilevel hierarchical tags may be configured so that a parent-child relationship is established through the application of iterative refinements. The indexing operates asynchronously from the data ingest across a decoupling boundary. When ingestion and normalization complete a push notification may be applied across the decoupling boundary to trigger operation the indexing module to update the search index based on anchor tags in relational tables of the normalized data set.

The system enables on-demand retrieval by client devices of highly customized information for use in analytics and reporting, based on recently and periodically acquired data sets from disparate computer server systems with improved performance and lower latency than is available with conventional approaches.

In one embodiment data objects are generated for statistical and competitive modeling at higher resolution than some conventional approaches. Tagged inputs may be structured as nodes such that tags inherit features from parents tags. Tags may be utilized in Boolean combination such that instead of merely narrowing search results, combination tags may map to a wider set of data while also ignoring overlapping results.

In some aspects, a distributed data communication and transformation system includes an ingest module operative on a first side of a de-coupling boundary, the ingest module including a web integration service. The system further includes a normalizing module, and an outflow module operative on a second side of the de-coupling boundary, the outflow module including an indexing module configured to transform outputs of the normalizing module into a search index, the indexing module operative asynchronously from the normalizing module and the web integration service across the de-coupling boundary, and an outflow engine dynamically configurable from the second side of the de-coupling boundary to filter outputs of the search index without signaling across the de-coupling boundary.

In other aspects, a distributed data communication and transformation system includes an ingest module operative on a first side of a de-coupling boundary, the indexing module comprising a hot connection module configured with cadence rules for a plurality of disparate computer server systems. The system further includes an outflow module operative on a second side of the de-coupling boundary, the outflow module including an indexing module operative asynchronously from operation of the ingest module across the de-coupling boundary to transform outputs of the hot connection module into a search index; and an outflow engine dynamically configurable from the second side of the de-coupling boundary to apply onto transaction records referenced in the index a hierarchical transaction grouping control structure configurable from a mobile application independently of a search query session, the hierarchical transaction grouping control structure comprising one or more inheritance tag relationships and one or more container tag relationships.

In other aspects, a method of operating a distributed computer system includes operating an ingest module on a first side of a de-coupling boundary to normalize outputs of a hot connection module, processing the normalized outputs with an indexing module operated asynchronously from the ingest module on a second side of the de-coupling boundary to generate a search index, and operating a mobile application to apply onto transaction records referenced in the search index a hierarchical transaction grouping control structure independently of search query sessions on the search index, the hierarchical transaction grouping control structure comprising one or more inheritance tag relationships and one or more container tag relationships.

The ingest module may push the outputs of the normalizing module across the de-coupling boundary. The hot connection module may be responsive to a plurality of metadata control settings for disparate computer server systems, the control settings implementing cadence rules for connection to and data transfer from the disparate computer server systems. The hot connection module may be configured to execute a connection cadence on each of the disparate computer server systems based on the cadence rules. The normalizing module may implement a plurality of data transformation algorithms to apply to output of the web integration service. The ingest module and the outflow module may be serverless.

FIG. 1 depicts a distributed computing platform 100 in one embodiment. At a high level, the distributed computing platform 100 comprises an ingest module 102 and an outflow module 104 that interoperate across a de-coupling boundary 106. The ingest module 102 and outflow module 104 exchange data and control signals with user interface logic 108.

The ingest module 102 is operatively coupled to the user interface logic 108 and activates on a schedule to pull data from disparate computer server systems. The ingest module 102 is operatively coupled to the outflow module 104 and passes normalized data across the de-coupling boundary 106 to the outflow module 104. The outflow module 104 is communicatively coupled to the user interface logic 108 allowing a user to instrument a pipeline of normalized data from the ingest module 102 to the outflow module 104 and from there to the user interface logic 108 using hierarchical filter control settings, referred to herein as 'tags'.

The user interface logic 108 depicted here includes one or more of a mobile application 110, a web application 112, and a plug-in 114. The mobile application 110 and the web application 112 enable user interaction with and configuration of the distributed computing platform 100. The plug-in 114 provides an interface between a restful logic component such as Excel and the distributed computing platform 100.

The ingest module 102 comprises a scheduler 116, a web service integration 118, and a data storage and processing engine 120. The ingest module 102 is a serverless implementation that activates and deactivates services dynamically to ingest raw data from disparate computer server systems into a normalized format, according to individual schedules for each of the disparate computer server systems. "Serverless" refers to a computing system architected such that performance scalability is enabled by configuring, either automatically or via manually configured control settings, units of resource consumption (e.g., computational units, communication bandwidth, memory) rather than by adding or removing entire computer servers. Data ingest is controlled by a scheduler 116 and cadence rules 122. The scheduler 116 utilizes the cadence rules 122 to operate the web service integration 118, which opens connections and pulls data for further processing by the data storage and processing engine 120.

A hot connection module 124 manages the connections utilized by the web service integration 118 to pull data from the disparate computer server systems. The web service integration 118 invokes a dynamic application program interface (API) to each of the disparate computer server systems; each API may be specific to a particular server system and the connection via the API is controlled and maintained by the hot connection module 124.

The data storage and processing engine 120 operates a normalizing module 126 on a raw data set 128 received from the web service integration 118. This results in a normalized data set with consistent fields regardless of the specific format of the raw data sets from different ones of the disparate computer server systems. The normalizing module 126 utilizes a dynamically activated set of algorithms specific to the format of the data source. These algorithms perform functions such as file conversion, parsing, and analysis, and are well known in the art.

The connections established and maintained by the hot connection module 124 are "hot connections" that are opened and closed dynamically such that the connection is made persistent per rules established by institution-specific security protocols—OAuTH, tokenized, dual authentication etc. These rules may be configured in the hot connection module 124 or the scheduler 116 or both.

The scheduler 116 acts as a throttle/rate limiter based on a hierarchical prioritization of at least the following parameters (see FIG. 6):
1. institution restrictions on data access (connections or data amounts) per time interval
2. data availability or update schedules
3. user access privileges for the institution (what data are they allowed access to and how often)
4. institutional limits on data transfer amounts/rates per session Normalized data is communicated from the ingest module 102 to the outflow module 104 across the de-coupling boundary 106. The de-coupling boundary 106 is a computer resource utilization boundary separating the operation of the ingest module 102 and the outflow module 104. The de-coupling boundary 106 enables the ingest module 102 to operate independently and at a different rate from the outflow module 104; particularly the indexing module 130 of the outflow module 104 may operate asynchronously from the ingest and normalization of data by the ingest module 102.

Figure 2A:
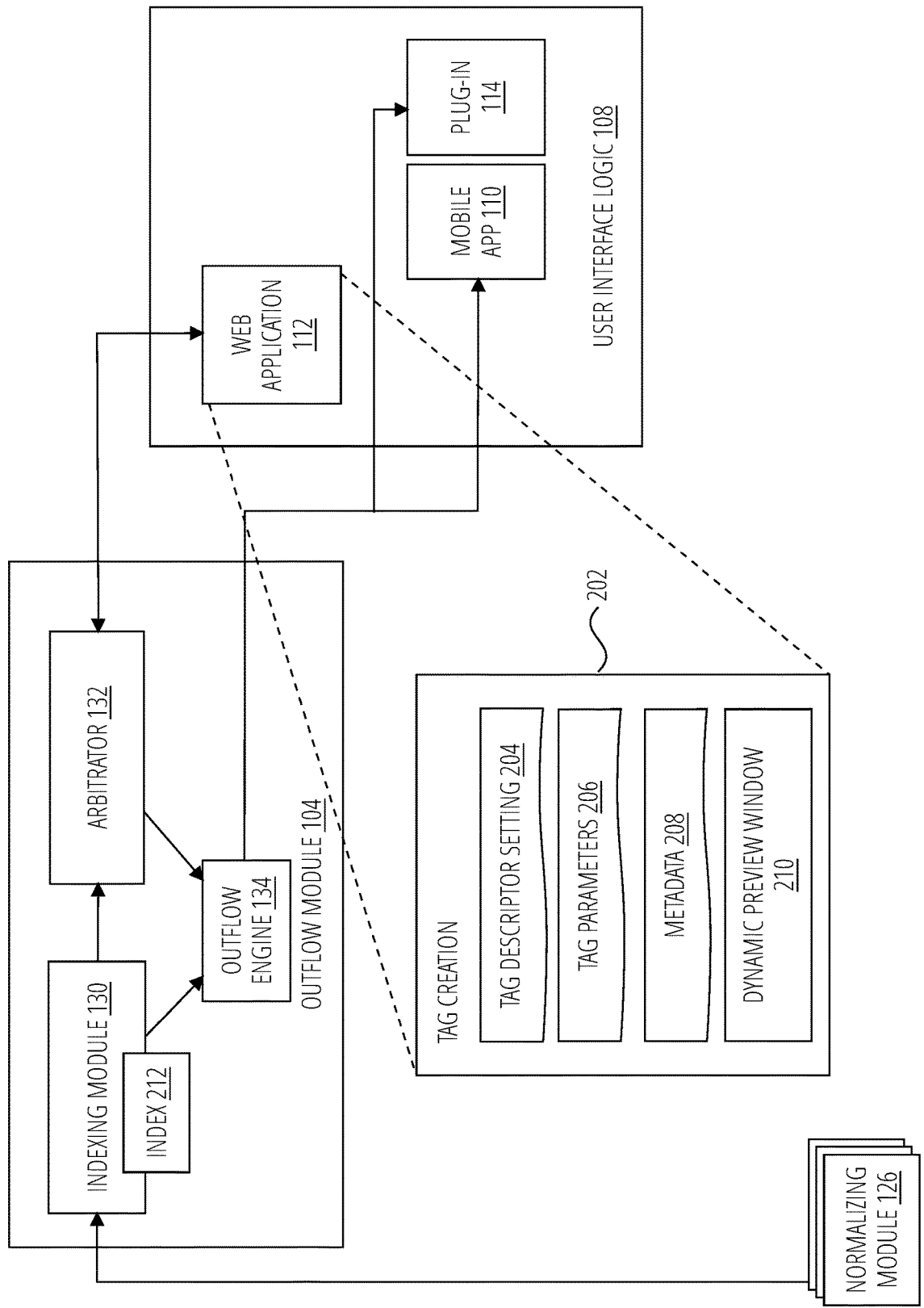
FIG. 2A depicts the distributed computing platform 100 in additional aspects.

The outflow module 104 comprises an arbitrator 132, an indexing module 130, and an outflow engine 134. The outflow module 104 is a serverless implementation for data delivery for which services are activated and deactivated dynamically per client. The indexing module 130 is operatively coupled to the arbitrator 132 which manages contention for the outflow engine 134 among the various clients requesting data via the user interface logic 108. The arbitrator 132 also controls the operation of the outflow engine 134 based on hierarchical filters configured via the web application 112, as depicted in FIG. 2A.

The user interface logic 108 may be operated to configure the indexing module 130 with multiple tags to configure a multi-level control structure. During a session that occurs as part of a query or keyword search, the query is input to the outflow module and applied to the indexing module 130 as a setting. Settings on the app 902 operate such that when a new batch of data is received across the de-coupling boundary 106 during the session the new batch of data is binned according to the settings determined by the query. Because this takes place in the context of a query session, it functions as a sticky setting that affects future normalized data that comes across the de-coupling boundary 106 to the indexing module 130.

Index settings may be implemented as tags that transform the identified transaction data. The indexing module 130 receives normalized transaction data from the ingest module 102 and transforms the normalized data through the application of the tags that label the transaction data associated with the query. This process may be performed asynchronously from the operation of the outflow module 104.

The tags are utilized to build a query structure for refining and/or enhancing the set of returned transaction data in response to a query. The tags implement a nodal structure for transaction data by combining tagged data into data sets. When tags are combined any duplicate entries are identified to avoid collision (double counting). A combination of tags may be applied to form sets of transaction data meeting complex criteria. The ingest module 102 is enabled to process new batches of transaction data to remove duplicates transactions that overlap with previous tags.

The user interface logic 108 may enable the application of exclusion tags that embody settings for the exclusion of data sets from results of multiple queries. For example, there may be parent tag comprising a plurality of tags (e.g., 80 tags) that maps to a large set of transactions. In some instances, the data set matching these parent tags may return undesirable results (e.g., unrelated entries, etc.) that may originate from a change in a data sources naming schema. Identifying and removing or modifying specific existing tags that give rise to the undesirable results may be complex computational task. Exclusion tags may be added to remove the unwanted entries without removing or modifying existing tags. The exclusion tags may be added in the same manner as other tags.

The meta-indexer 136 controls the indexing module 130 based on the activity of multiple tenants of the distributed computing platform 100. In the distributed computing platform 100, multiple tenants may share the same executions resources to perform their operations while keeping their data separate. A meta-indexer 136 may be implemented with access to the data from all the tenants utilizing the distributed computing platform 100. The meta-indexer 136 may analyze the larger data set and identify structures within the larger data set that have common attributes. The meta-indexer 136 may form tags that target these structures and these tags may be presented as suggestions to the various tenants. In some configurations, the meta-indexer 136 may globally monitor the activities of the indexing module 130 from different tenants and identify tags that are applied. These tags may be suggested or automatically applied to data of the various other tenants.

In some configurations, the outflow module 104 may include an alert generator 138 for generating alerts to the user interface logic 108 based on sensitivity settings configured at locations of the indexing module 130's generated control structure(s). The alert generator 138 communicates with the arbitrator 132 which generates an alert notification that is communicated to the user interface logic 108 when the condition defined by the sensitivity settings are met. The tags may also include sensitivity settings that not only are activated during client runtime sessions, but that may also activate asynchronously outside of runtime sessions. These sensitivity settings generate alert notifications for the mobile application when certain values, events, combinations thereof, or other conditions of the index are detected.

For example, a tag is set up that identifies a large data set. Within this tag a condition or trigger may be configured to generate an alert if an entry or transaction is identified at indexing time as having a value that exceeds a threshold. As the indexing module 130 is running in real time on data flowing in from the ingest module 102 and building the control structure, the arbitrator 132 is reading is reading all the entries that are indexed. Upon detecting the conditions or triggers, the arbitrator 132 communicates to the alert generator 138 which sends an alert to the user interface logic 108. The alert generator 138 may be also configured to communicate to the alert as a push notification to the mobile application 110, plug-in 114, the web application 112, or combinations thereof.

Figure 6:
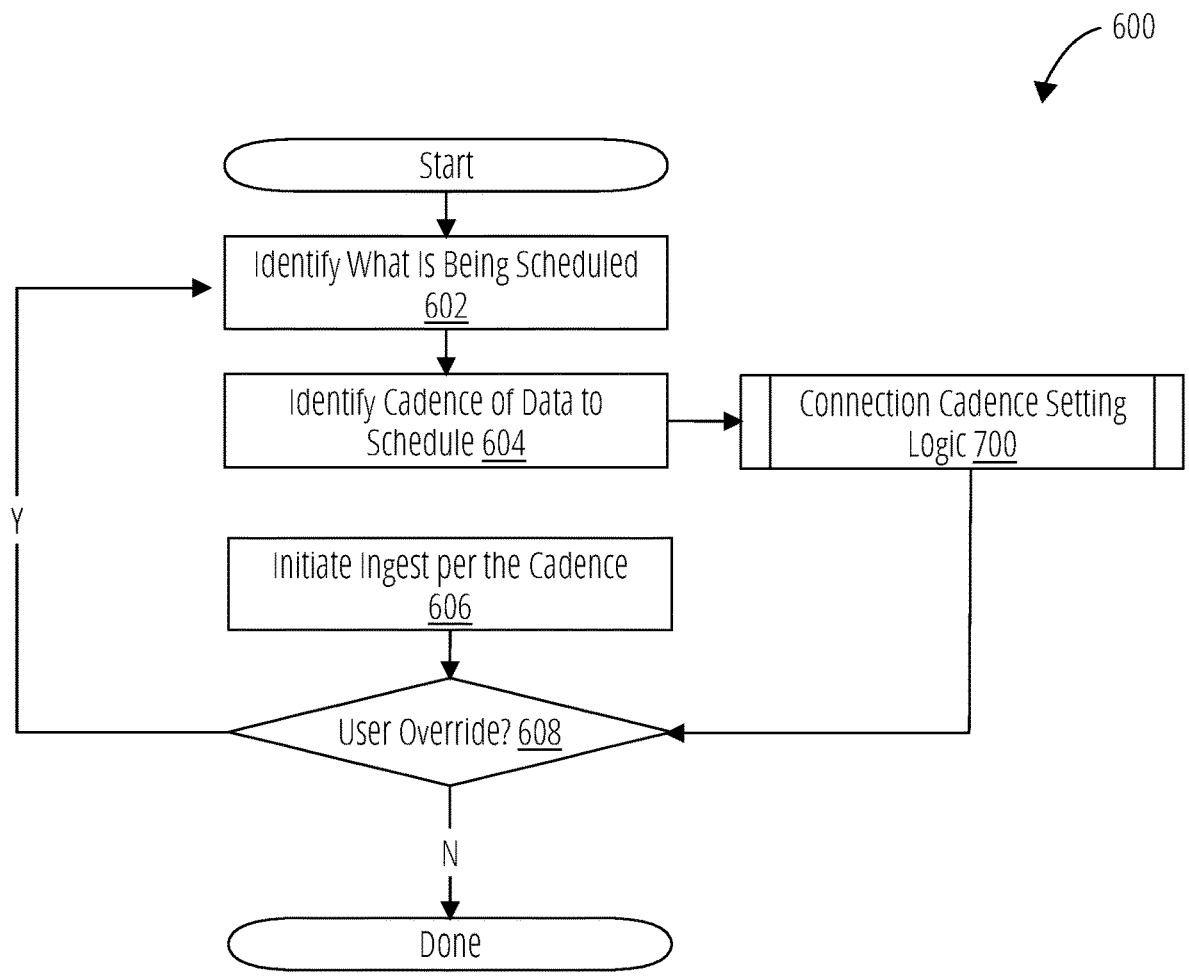
FIG. 6 depicts inter-system connection scheduler logic 600 in accordance with one embodiment.
Figure 7:
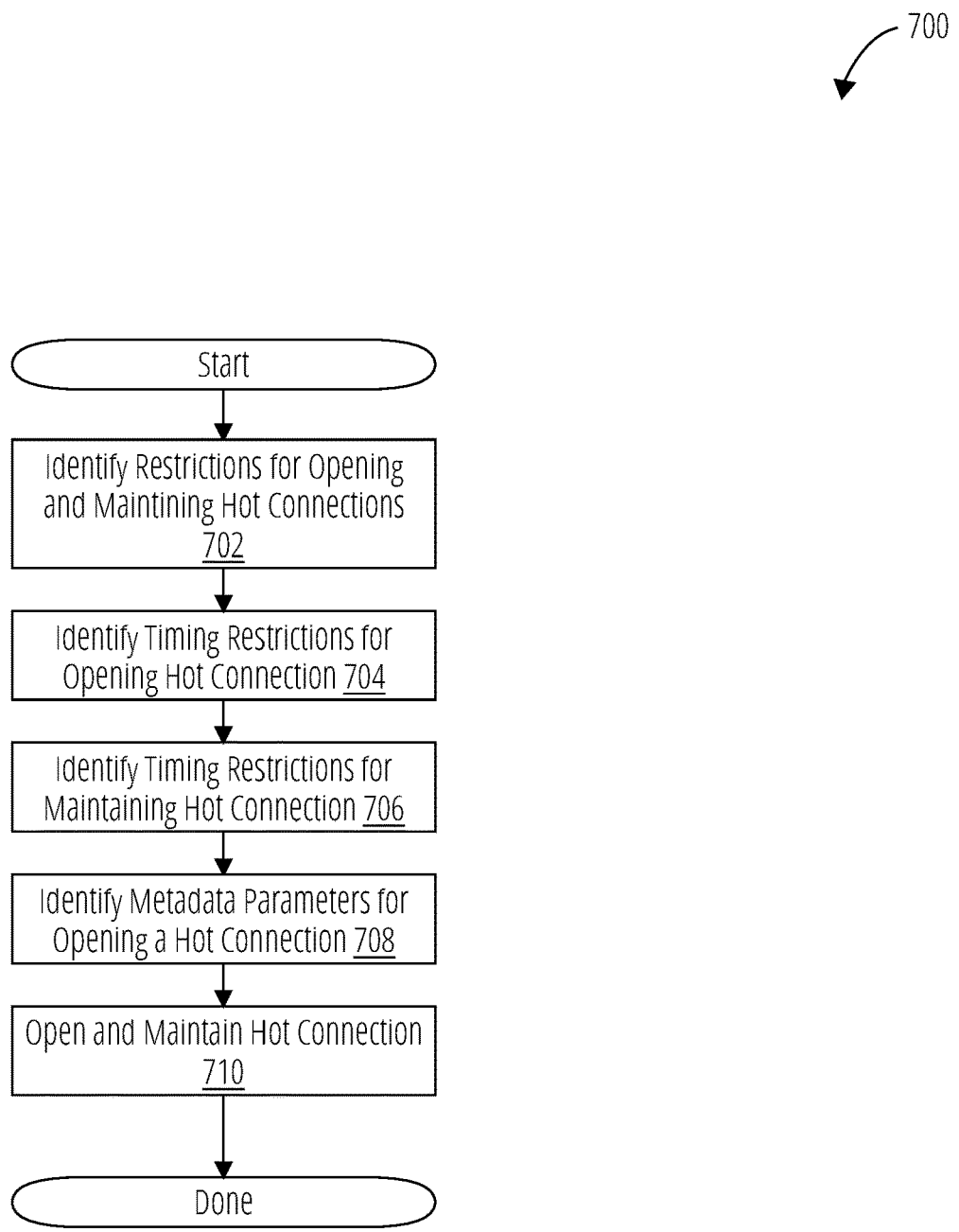
FIG. 7 depicts connection cadence setting logic 700 in accordance with one embodiment.
Figure 8:
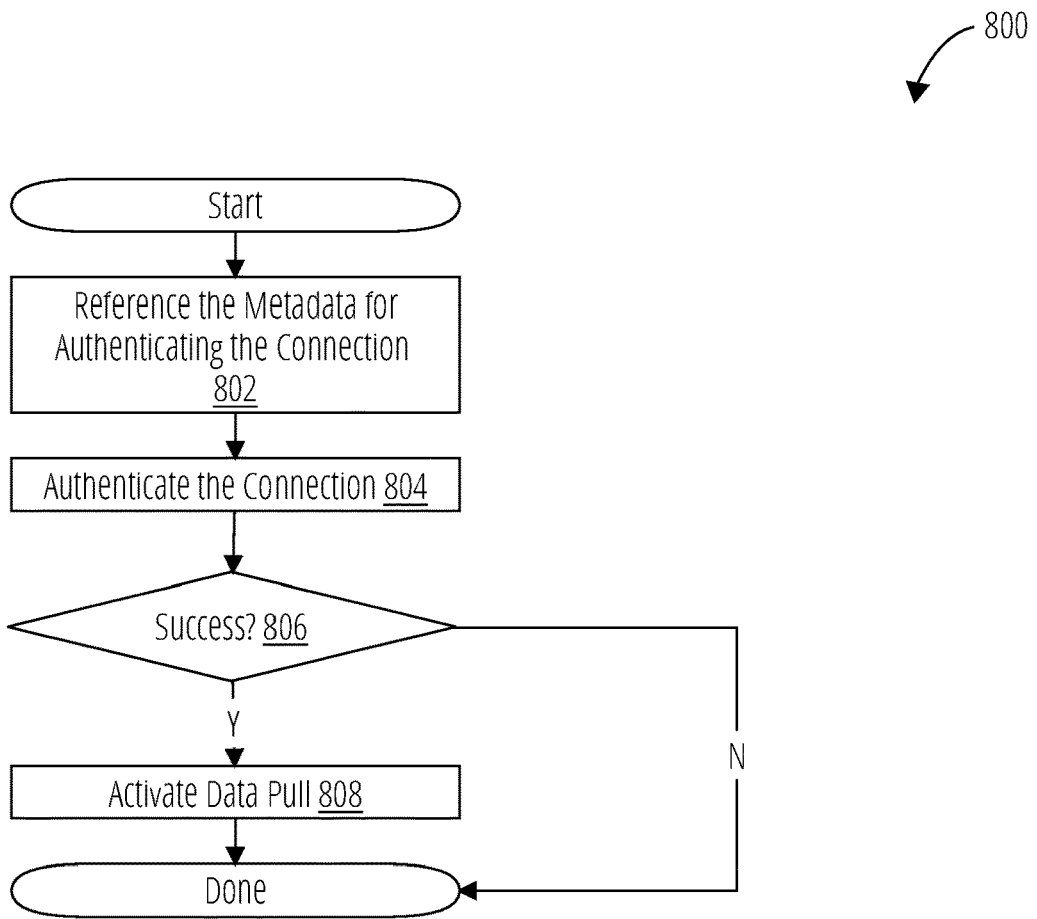
FIG. 8 depicts hot connection logic 800 in accordance with one embodiment.

The distributed computing platform 100 may, in one embodiment, operate according to the processes depicted in FIG. 6 through FIG. 8.

FIG. 2A depicts tagging logic 202 in one embodiment. The web application 112 is depicted in more detail and comprises tagging logic 202 that provides a tag descriptor setting 204, tag parameters 206, metadata 208, and a dynamic preview window 210.

The tagging logic 202 enables the configuration of tags comprising settings. The tag descriptor setting 204 is a label to concisely reference the tag for future use. The tag parameters 206 along with the metadata 208 form settings to apply to structure the normalized data generated by the ingest module. The metadata 208 may for example identify specific institutions, accounts, currencies, and/or transaction types. Other types of metadata 208 may also be selectable. The dynamic preview window 210 displays normalized data that would be associated with the tag as it is currently configured. To form a hierarchical control structure, one or more tag descriptor setting 204 for existing tags may be set in the tag parameters 206. The tag parameters 206 may be generated in many ways, including explicit selections, automatically from search queries, and from natural language inputs. The tag parameters 206 may be applied as "fuzzy" parameters as that term is normally understood in the art. Some of the tag parameters 206, such as the institutions and accounts, may be "anchor" settings that associate with specific records in one or more database comprising the normalized transaction records.

The control structures based on tags are configurable from the mobile application 110 of end users, independently of a search query session between the mobile application 110 and the outflow module 104. Tag-based structuring may be applied to the transaction index 212 independently for each user and/or organization, rather than being a global property of the index 212.

Substantial performance improvements are realized by building the search index 212 based on relational tables in the normalized data set that includes fields for the anchor tag parameters 206, and then generating search results from the index 212 constrained by groupings defined by a hierarchical control structure comprising tag parameters 206 that are not anchored but instead implemented as controls applied to the transaction records in the index 212. The groupings are applied dynamically (as client requests are received). The control structure may for example implement white list and black list constraints on search engine results returned to the web application 112 by the outflow engine 134.

The indexing module 130 is asynchronously coupled to the normalizing module 126 to receive the normalized data across the de-coupling boundary 106. The web application 112 is communicatively coupled to the arbitrator 132 to configure the arbitrator 132 with one or more configured tag for the outflow engine 134 to apply to the index 212 generated by the indexing module 130. The outflow engine 134 is operatively coupled to communicate result sets thus generated to the mobile application 110 and/or the plug-in 114 (for example).

The distributed computing platform 100 may in one embodiment operate according to the process depicted in FIG. 6 through FIG. 8.

FIG. 2B depicts a user application program interface 214 for tagging logic 202 in one embodiment. The user application program interface 214 comprises a tag descriptor setting 204, a dynamic preview window 210, a metadata 208, and a tag parameters 206. The tag descriptor setting 204 include the tag name and tag description fields. A user sets a label for the tag (e.g., "Payroll") and a tag description (e.g., "All payroll transactions") to help identify the tag later on. A user may also select the auto-tag option to continue automatic tagging of new transactions ingested into the system that match the tagging criteria.

Tags may also be configured by type. There are parameter based tags, and tag-based tags. Parameter based tags are tags created based on a set of tag parameters 206 such as query values (e.g., terms), date ranges and metadata 208 such as the transaction types, data source names, accounts, and currencies (e.g., USD, etc.). Tag-based tags are combination tags to identify existing tags to be utilized in combination with a new tag. A tag-based tag may comprise Boolean or mathematical, or both, combinations of parameter-based tags and/or other tag-based tags.

With each configuration of the tag parameters 206, transactions within the dynamic preview window 210 are modified to reflect the change in parameters. When a user is satisfied with the results, they may save the created tag.

Figure 3:
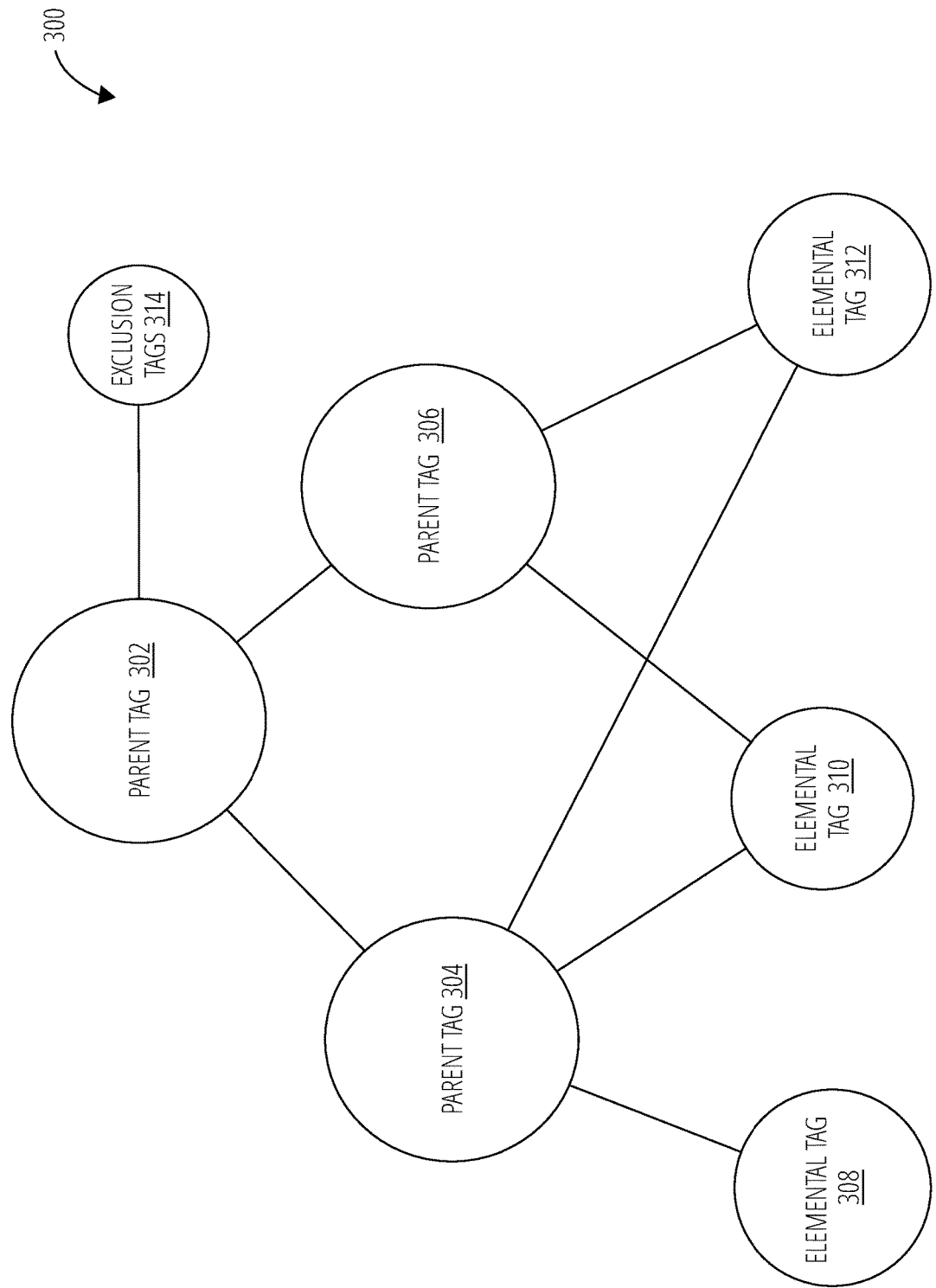
FIG. 3 depicts a control structure 300 in accordance with one embodiment.

FIG. 3 depicts a control structure 300 in one embodiment. The control structure 300 comprises a top-level parent tag 302 that inherits structure from a parent tag 304 and parent tag 306. These in turn inherit structure from elemental tag 308, elemental tag 310, and elemental tag 312. Exclusion tags 314 are applied in this example to the top-level parent tag 302.

Figure 4:
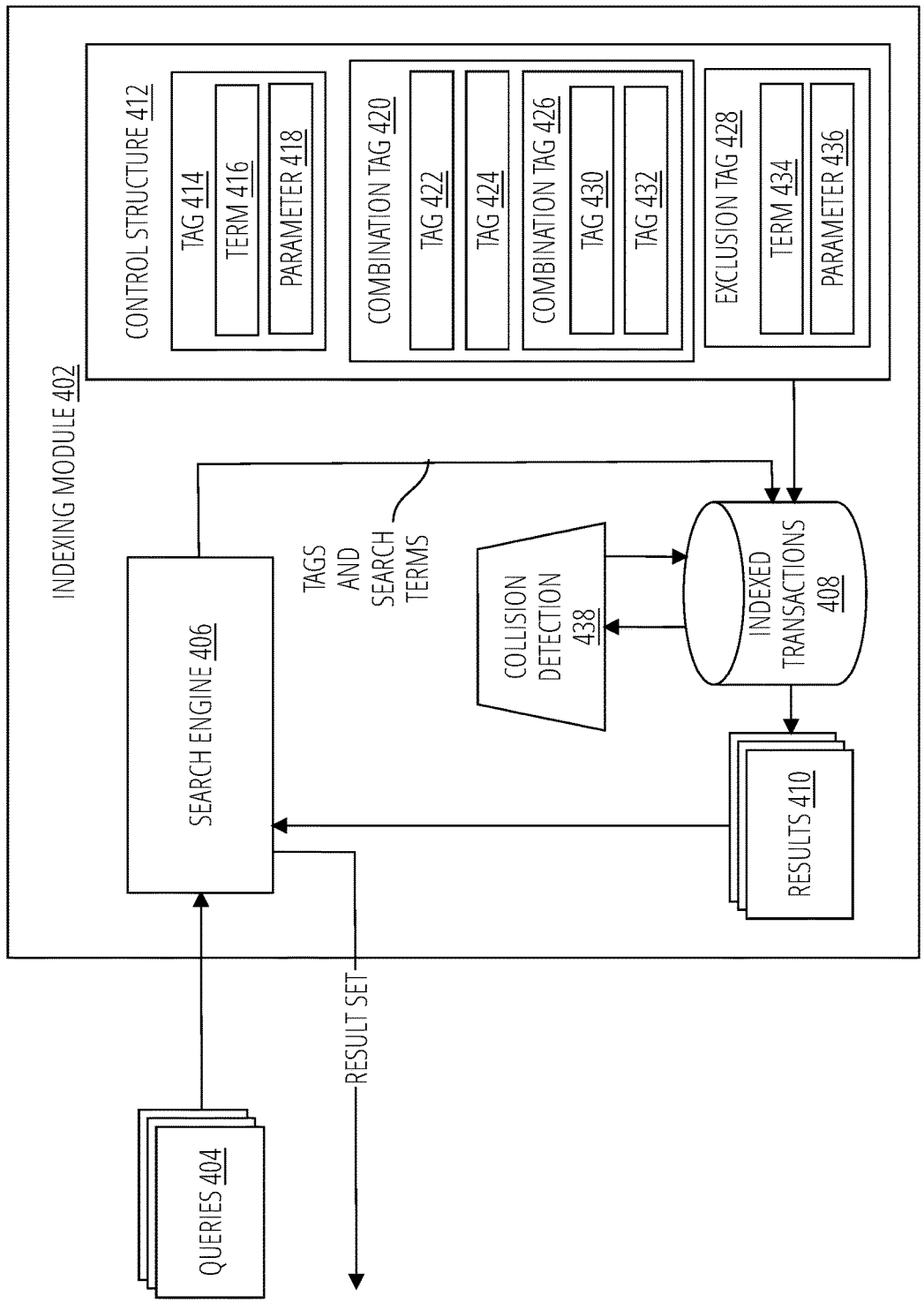
FIG. 4 depicts an embodiment of an indexing module 402 in additional aspects.

FIG. 4 depicts an indexing module 402 in one embodiment. Queries 404 are input to the search engine 406 and applied against a database of indexed transactions 408 to generate results 410 returned to the mobile application 110. The search engine 406 applies tags from the queries 404 and/or search terms from the queries 404 to the indexed transactions 408. The control structure 412 imposes a grouping structure within the indexed transactions 408 as transactions are received across the de-coupling boundary 106. This structure is traversed to match the tags and search terms from the queries 404. The control structure 412 is organized asynchronously from the queries 404 (e.g., using the web app) and rate matched to the operation of the ingest module 102.

When viewed in conjunction with FIG. 3, it may be appreciated that the control structure 412 may be structured hierarchically both in terms of inheritance (vertical and lateral i.e. parent-child or sibling-sibling inheritance) and container (nesting) relationships among tags.

The control structure 412 in this example comprises a hierarchical structure of tags. At the highest level are parameter tag 414 (comprising term 416 and parameter 418), combination tag 420 (comprising parameter tag 422, parameter tag 424, and combination tag 426), and exclusion tag 428. The combination tag 426 of the combination tag 420 comprises parameter tag 430 and parameter tag 432. The exclusion tag 428 comprises term 434 and parameter 436. The control structure 412 demonstrates the richness of possible grouping structures that may be imposed on the indexed transactions 408. Collision detection 438 is performed on the groupings to remove duplicates from the grouping structures of the indexed transactions 408.

The decoupling of transaction indexing from ingest, of transaction indexing from formation of the control structure 412 imposed on the indexed transactions 408, and of both indexing and formation of the control structure 412 from runtime filtering, may substantially improve both performance of the search engine 406 and the flexibility and richness of the results 410 generated in response to the queries 404.

Figure 5:
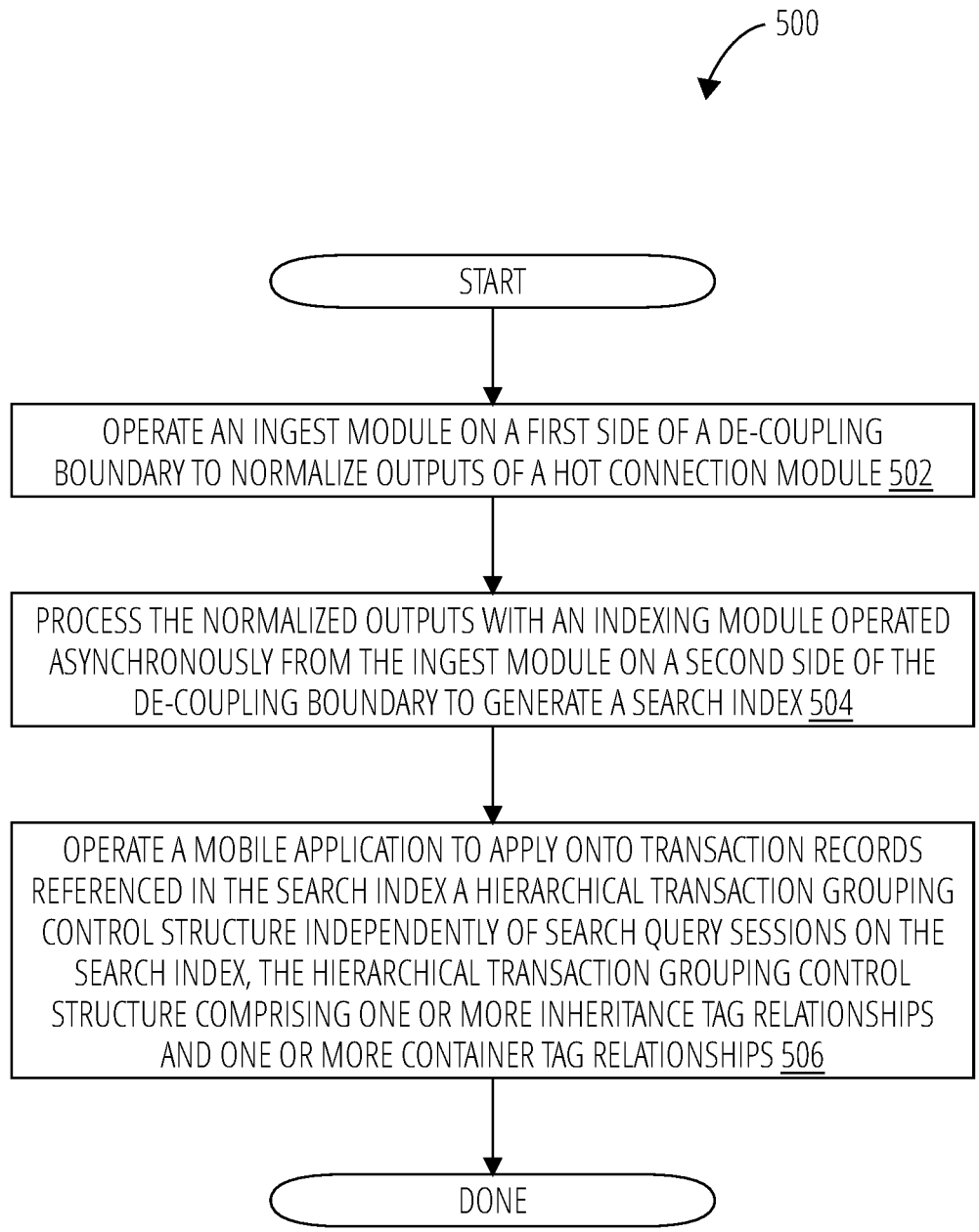
FIG. 5 depicts a computer system routine 500 in accordance with one embodiment.

FIG. 5 depicts a computer system routine 500 in one embodiment. In block 502, the computer system routine 500 operates an ingest module on a first side of a de-coupling boundary to normalize outputs of a hot connection module. In block 504, the computer system routine 500 processes the normalized outputs with an indexing module operated asynchronously from the ingest module on a second side of the de-coupling boundary to generate a search index. In block 506, the computer system routine 500 operates a mobile application to apply onto transaction records referenced in the search index a hierarchical transaction grouping control structure independently of search query sessions on the search index, the hierarchical transaction grouping control structure comprising one or more inheritance tag relationships and one or more container tag relationships.

FIG. 6 depicts an inter-system connection scheduler logic 600 in one embodiment. The inter-system connection scheduler logic 600 may be implemented for example in the scheduler 116. The actions depicted should not be presumed to occur in the order presented, unless an action depends on the result of a previous action to be carried out. If two or more actions are not conditioned on one another in some way, one skilled in the art will readily ascertain that they may be carried out in parallel, in a time-division fashion, or in a different order.

At block 602, the inter-system connection scheduler logic 600 identifies which data sources are being scheduled. This action may be carried out for example by the scheduler 116 by way of the user interface logic 108. This action may result in the identification of data to pull and from which of the disparate computer server systems that act as data sources.

At block 604, the inter-system connection scheduler logic 600 identifies the cadence of the scheduled data. This action may be carried out by the scheduler 116 and may be embodied in the cadence rules 122. This action may result in invocation of a connection cadence setting logic 700 as depicted in more detail in FIG. 7.

At block 606, the inter-system connection scheduler logic 600 initiates ingest of data as per the cadence rules 122. This action may be carried out by the web service integration 118 by way of the hot connection module 124. This action may result in data being pulled and stored from various banking of the disparate computer server systems through dynamic API connections managed by the hot connection module 124 according the scheduler 116 and the cadence rules 122.

At decision block 608, the inter-system connection scheduler logic 600 carries out a determination for the presences of a user override received from the connection cadence setting logic 700. "User override" refers to a control setting by a user that preempts or replaces a system setting. This test may be carried out by the scheduler 116 and the cadence rules 122. This determination results in identification of a user override or the absence of the user override. If a user override is detected, the inter-system connection scheduler logic 600 returns to the block 602 where the inter-system connection scheduler logic 600 beings again by identifying the data to schedule. If a user override is not detected the process terminates. A user override may originate from a number of sources such as a system operator of the distributed computing platform 100, or a user of client logic such as the user interface logic 108.

FIG. 7 depicts connection cadence setting logic 700 in one embodiment. The connection cadence setting logic 700 may be operated to set cadence for pulling data from disparate computer server systems in accordance with their access and security protocols. The actions depicted should not be presumed to occur in the order presented, unless an action depends on the result of a previous action to be carried out. If two or more actions are not conditioned on one another in some way, one skilled in the art will readily ascertain that they may be carried out in parallel, in a time-division fashion, or in a different order.

At block 702, the connection cadence setting logic 700 identifies availability restrictions for establishing the hot connections. This action may be carried out in accordance with the cadence rules 122 by hot connection module 124. This action results in the identification of data access availability.

At block 704, the connection cadence setting logic 700 identifies timing restrictions for opening hot connections and again is implemented by the hot connection module 124 in accordance with the cadence rules 122. This action results in the identification of timing restrictions such as required intervals between connections or permissible or blackout connection times for institution-specific security protocols—OATH, tokenized, dual authentication etc.

At block 706, the connection cadence setting logic 700 identifies timing restrictions for maintaining hot connections and again is implemented by the hot connection module 124 in accordance with the cadence rules 122. This action results in the identification of timing restrictions such as timeout intervals and restrictions on connection duration for institution-specific security protocols—OAuTH, tokenized, dual authentication etc.

At block 708, the connection cadence setting logic 700 (e.g., the hot connection module 124) identifies metadata parameters for opening and establishing a hot connection. This action results in the identification of connection protocol and API-specific parameters, including authentication and authorization parameters, for opening and maintaining a hot connection.

Following block 708, the connection cadence setting logic 700 moves to block 710 where the connection is established and maintained by the hot connection module 124 and scheduled data pulls are made from the disparate computer server systems.

FIG. 8 depicts hot connection logic 800 in one embodiment. The hot connection logic 800 establishes and maintains hot connections with external disparate computer server systems. The actions depicted should not be presumed to occur in the order presented, unless an action depends on the result of a previous action to be carried out. If two or more actions are not conditioned on one another in some way, one skilled in the art will readily ascertain that they may be carried out in parallel, in a time-division fashion, or in a different order.

At block 802, the hot connection logic 800 references the connection type and API metadata to begin authentication and authorization with one of the disparate computer server systems. This action and subsequent ones of the hot connection logic 800 would typically be carried out by the hot connection module 124 in accordance with the cadence rules 122. At block 804, the hot connection logic 800 utilizes the metadata to authenticate/authorize and establish a connection with the external system.

At decision block 806, the hot connection logic 800 determines whether the connection was successfully established. If the determination identifies that the connection was successful, the hot connection logic 800 moves to block 808 where the data pull is activated. If the connection was not successful, the process either terminates or retries the establishment of the connection.

The systems disclosed herein, or particular components thereof, may typically be implemented as software comprising instructions executed on one or more programmable device. By way of example, components of the disclosed systems may be implemented as an application, an app, drivers, or services. In one particular embodiment, the system is implemented as a service that executes as one or more processes, modules, subroutines, or tasks on a server device so as to provide the described capabilities to one or more client devices over a network. However the system need not necessarily be accessed over a network and could, in some embodiments, be implemented by one or more app or applications on a single device or distributed between a mobile device and a computer, for example.

Figure 9:
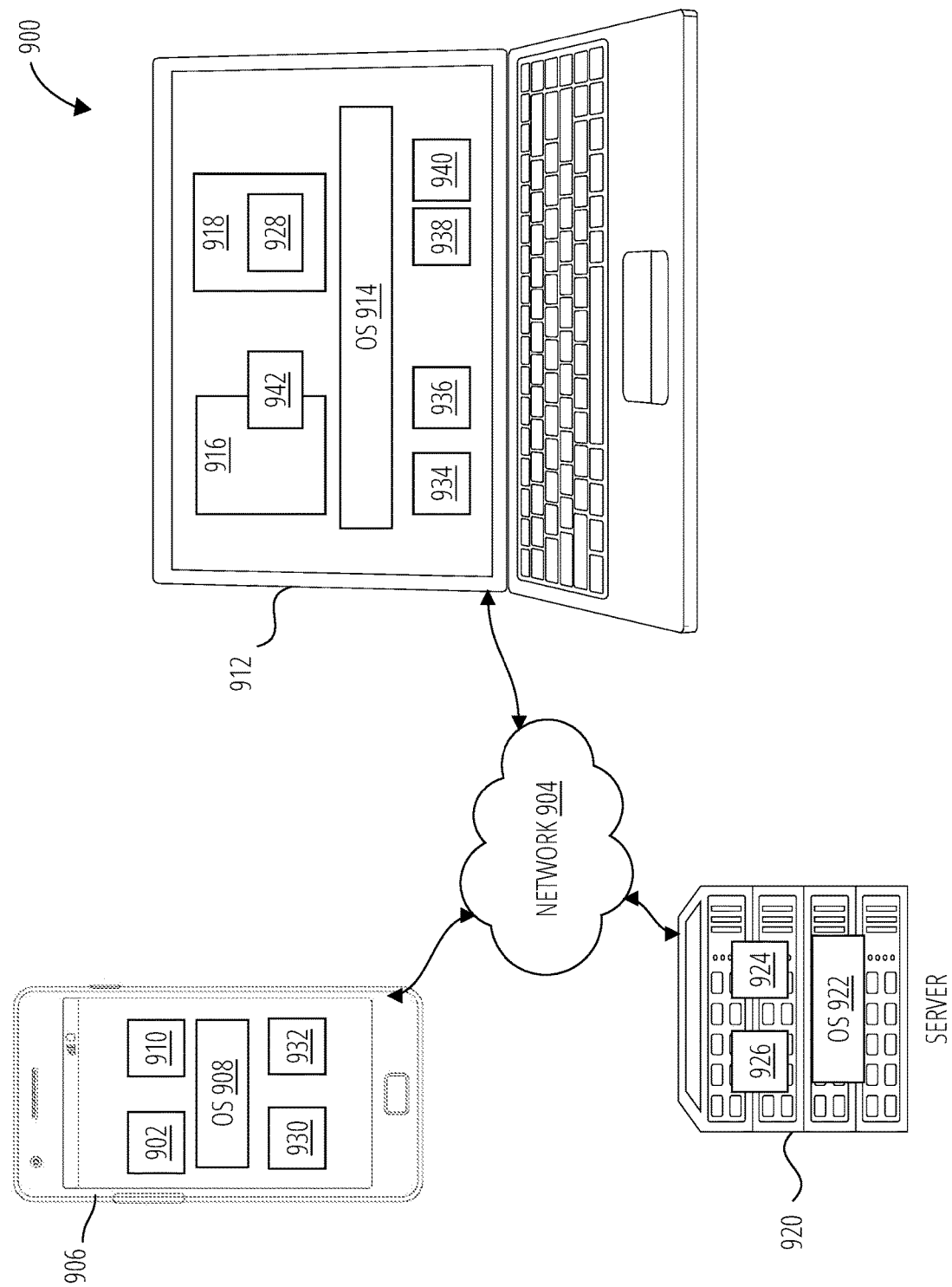
FIG. 9 depicts a client server network configuration 900 in accordance with one embodiment.

Referring to FIG. 9, a client server network configuration 900 depicts various computer hardware devices and software modules coupled by a network 904 in one embodiment. Each device includes a native operating system, typically pre-installed on its non-volatile RAM, and a variety of software applications or apps for performing various functions.

The mobile programmable device 906 comprises a native operating system 908 and various apps (e.g., app 902 and app 910), one or more of which may implement the mobile application 110 (e.g., as a mobile app). A computer 912 also includes an operating system 914 that may include one or more library of native routines to run executable software on that device. The computer 912 also includes various executable applications (e.g., application 916 and application 918). The mobile programmable device 906 and computer 912 are configured as clients on the network 904. A server 920 is also provided and includes an operating system 922 with native routines specific to providing a service (e.g., service 924 and service 926) available to the networked clients in this configuration. As previously noted, various components of the ingest module 102 and/or outflow module 104 may be implemented as such services.

As is well known in the art, an application, an app, or a service may be created by first writing computer code to form a computer program, which typically comprises one or more computer code sections or modules.

A compiler is typically used to transform source code into object code and thereafter a linker combines object code files into an executable application, recognized by those skilled in the art as an "executable". The distinct file comprising the executable would then be available for use by the computer 912, mobile programmable device 906, and/or server 920. Any of these devices may employ a loader to place the executable and any associated library in memory for execution. The operating system executes the program by passing control to the loaded program code, creating a task or process. An alternate means of executing an application or app involves the use of an interpreter (e.g., interpreter 928).

In addition to executing applications ("apps") and services, the operating system is also typically employed to execute drivers to perform common tasks such as connecting to third-party hardware devices (e.g., printers, displays, input devices), storing data, interpreting commands, and extending the capabilities of applications. For example, a driver 930 or driver 932 on the mobile programmable device 906 or computer 912 (e.g., driver 934 and driver 936) might enable wireless headphones to be used for audio output(s) and a camera to be used for video inputs. Any of the devices may read and write data from and to files (e.g., file 938 or file 940) and applications or apps may utilize one or more plug-in (e.g., plug-in 942 which may implement plug-in 114) to extend their capabilities (e.g., to encode or decode video files).

The network 904 in the client server network configuration 900 can be of a type understood by those skilled in the art, including a Local Area Network (LAN), Wide Area Network (WAN), Transmission Communication Protocol/Internet Protocol (TCP/IP) network, and so forth. These protocols used by the network 904 dictate the mechanisms by which data is exchanged between devices.

Figure 10:
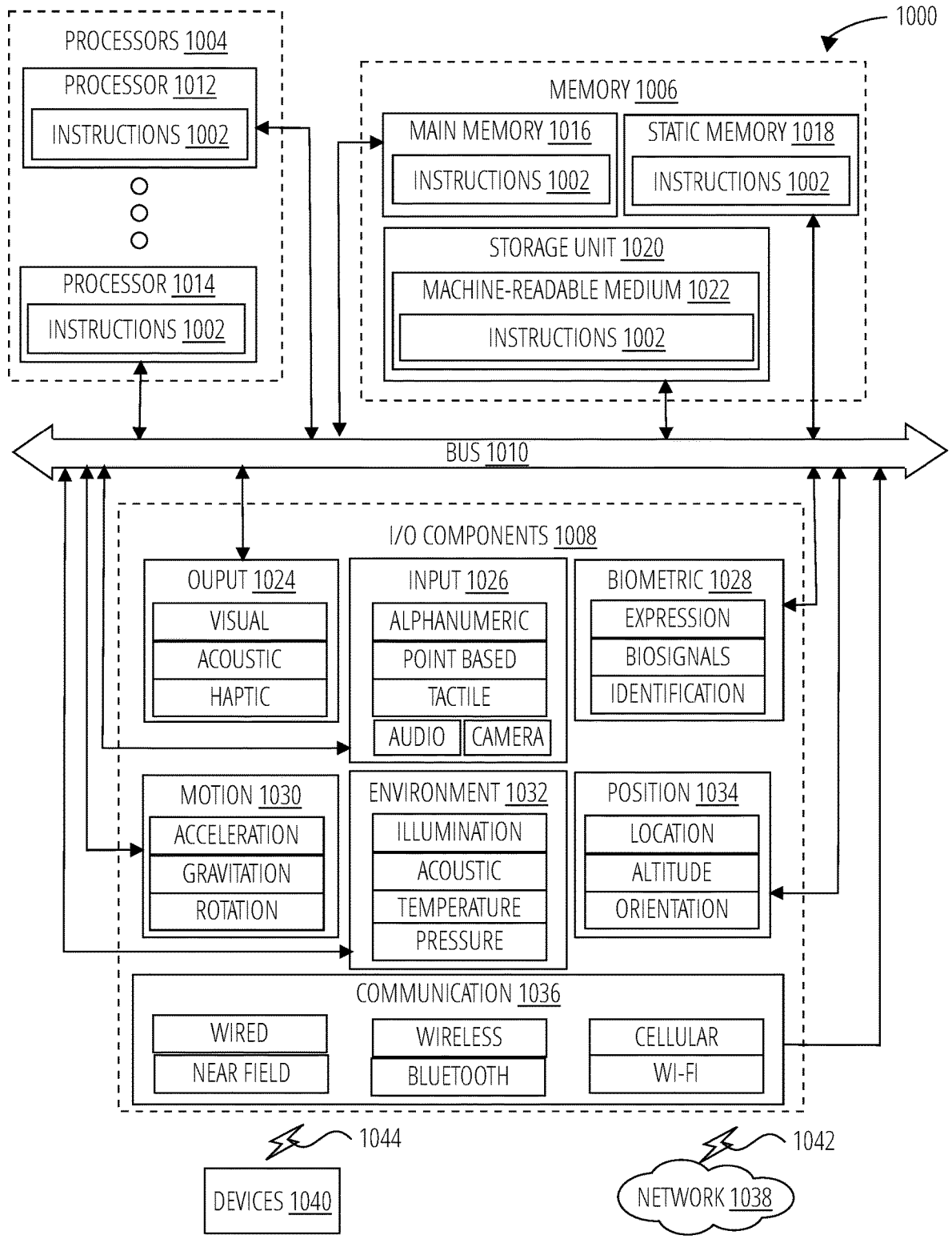
FIG. 10 depicts a machine 1000 in the form of a computer system within which a set of instructions may be executed for causing the machine to perform any one or more of the methodologies discussed herein, according to an example embodiment.

FIG. 10 depicts a diagrammatic representation of a machine 1000 in the form of a computer system within which logic may be implemented to cause the machine to perform any one or more of the functions or methods disclosed herein, according to an example embodiment.

Specifically, FIG. 10 depicts a machine 1000 comprising instructions 1002 (e.g., a program, an application, an applet, an app, or other executable code) for causing the machine 1000 to perform any one or more of the functions or methods discussed herein. For example, the instructions 1002 may cause the machine 1000 to implement the functionality described in conjunction with the distributed computing platform 100, control structure 300, indexing module 402, inter-system connection scheduler logic 600, connection cadence setting logic 700, and hot connection logic 800. The instructions 1002 configure a general, non-programmed machine into a particular machine 1000 programmed to carry out said functions and/or methods.

In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1002, sequentially or otherwise, that specify actions to be taken by the machine 1000. Further, while only a single machine 1000 is depicted, the term "machine" shall also be taken to include a collection of machines that individually or jointly execute the instructions 1002 to perform any one or more of the methodologies or subsets thereof discussed herein.

The machine 1000 may include processors 1004, memory 1006, and I/O components 1008, which may be configured to communicate with each other such as via one or more bus 1010. In an example embodiment, the processors 1004 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, one or more processor (e.g., processor 1012 and processor 1014) to execute the instructions 1002. The term "processor" is intended to include multi-core processors that may comprise two or more independent processors (sometimes referred to as "cores") that may execute instructions contemporaneously. Although FIG. 10 depicts multiple processors 1004, the machine 1000 may include a single processor with a single core, a single processor with multiple cores (e.g., a multi-core processor), multiple processors with a single core, multiple processors with multiples cores, or any combination thereof.

The memory 1006 may include one or more of a main memory 1016, a static memory 1018, and a storage unit 1020, each accessible to the processors 1004 such as via the bus 1010. The main memory 1016, the static memory 1018, and storage unit 1020 may be utilized, individually or in combination, to store the instructions 1002 embodying any one or more of the functionality described herein. The instructions 1002 may reside, completely or partially, within the main memory 1016, within the static memory 1018, within a machine-readable medium 1022 within the storage unit 1020, within at least one of the processors 1004 (e.g., within the processor's cache memory), or any suitable combination thereof, during execution thereof by the machine 1000.

The I/O components 1008 may include a wide variety of components to receive input, provide output, produce output, transmit information, exchange information, capture measurements, and so on. The specific I/O components 1008 that are included in a particular machine will depend on the type of machine. For example, portable machines such as mobile phones will likely include a touch input device or other such input mechanisms, while a headless server machine will likely not include such a touch input device. It will be appreciated that the I/O components 1008 may include many other components that are not shown in FIG. 10. The I/O components 1008 are grouped according to functionality merely for simplifying the following discussion and the grouping is in no way limiting. In various example embodiments, the I/O components 1008 may include output components 1024 and input components 1026. The output components 1024 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1026 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), one or more cameras for capturing still images and video, and the like.

In further example embodiments, the I/O components 1008 may include biometric components 1028, motion components 1030, environmental components 1032, or position components 1034, among a wide array of possibilities. For example, the biometric components 1028 may include components to detect expressions (e.g., hand expressions, facial expressions, vocal expressions, body gestures, or eye tracking), measure bio-signals (e.g., blood pressure, heart rate, body temperature, perspiration, or brain waves), identify a person (e.g., voice identification, retinal identification, facial identification, fingerprint identification, or electroencephalogram-based identification), and the like. The motion components 1030 may include acceleration sensor components (e.g., accelerometer), gravitation sensor components, rotation sensor components (e.g., gyroscope), and so forth. The environmental components 1032 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1034 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1008 may include communication components 1036 operable to couple the machine 1000 to a network 1038 or devices 1040 via a coupling 1042 and a coupling 1044, respectively. For example, the communication components 1036 may include a network interface component or another suitable device to interface with the network 1038. In further examples, the communication components 1036 may include wired communication components, wireless communication components, cellular communication components, Near Field Communication (NFC) components, Bluetooth® components (e.g., Bluetooth® Low Energy), WiFi® components, and other communication components to provide communication via other modalities. The devices 1040 may be another machine or any of a wide variety of peripheral devices (e.g., a peripheral device coupled via a USB).

Moreover, the communication components 1036 may detect identifiers or include components operable to detect identifiers. For example, the communication components 1036 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1036, such as location via Internet Protocol (IP) geolocation, location via Wi-Fi® signal triangulation, location via detecting an NFC beacon signal that may indicate a particular location, and so forth.

The various memories (i.e., memory 1006, main memory 1016, static memory 1018, and/or memory of the processors 1004) and/or storage unit 1020 may store one or more sets of instructions and data structures (e.g., software) embodying or utilized by any one or more of the methodologies or functions described herein. These instructions (e.g., the instructions 1002), when executed by processors 1004, cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors and internal or external to computer systems. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such intangible media, at least some of which are covered under the term "signal medium" discussed below.

In various example embodiments, one or more portions of the network 1038 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 1038 or a portion of the network 1038 may include a wireless or cellular network, and the coupling 1042 may be a Code Division Multiple Access (CDMA) connection, a Global System for Mobile communications (GSM) connection, or another type of cellular or wireless coupling. In this example, the coupling 1042 may implement any of a variety of types of data transfer technology, such as Single Carrier Radio Transmission Technology (1xRTT), Evolution-Data Optimized (EVDO) technology, General Packet Radio service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 1002 and/or data generated by or received and processed by the instructions 1002 may be transmitted or received over the network 1038 using a transmission medium via a network interface device (e.g., a network interface component included in the communication components 1036) and utilizing any one of a number of well-known transfer protocols (e.g., hypertext transfer protocol (HTTP)). Similarly, the instructions 1002 may be transmitted or received using a transmission medium via the coupling 1044 (e.g., a peer-to-peer coupling) to the devices 1040. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1002 for execution by the machine 1000, and/or data generated by execution of the instructions 1002, and/or data to be operated on during execution of the instructions 1002, and includes digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a matter as to encode information in the signal.

LISTING OF DRAWING ELEMENTS

100 distributed computing platform
102 ingest module
104 outflow module
106 de-coupling boundary
108 user interface logic
110 mobile application
112 web application
114 plug-in
116 scheduler
118 web service integration
120 data storage and processing engine
122 cadence rules
124 hot connection module
126 normalizing module
128 raw data set
130 indexing module
132 arbitrator
134 outflow engine
136 meta-indexer
138 alert generator
202 tagging logic
204 tag descriptor setting
206 tag parameters
208 metadata
210 dynamic preview window
212 index
214 user application program interface
300 control structure
302 parent tag
304 parent tag
306 parent tag
308 elemental tag
310 elemental tag
312 elemental tag
314 exclusion tags
402 indexing module
404 queries
406 search engine
408 indexed transactions
410 results
412 control structure
414 parameter tag
416 term
418 parameter
420 combination tag
422 parameter tag
424 parameter tag
426 combination tag
428 exclusion tag
430 parameter tag
432 parameter tag
434 term
436 parameter
438 collision detection
500 computer system routine
502 block
504 block
506 block
600 inter-system connection scheduler logic
602 block
604 block
606 block
608 decision block
700 connection cadence setting logic
702 block
704 block
706 block
708 block
710 block
800 hot connection logic
802 block
804 block
806 decision block
808 block 900 client server network configuration
902 app
904 network
906 mobile programmable device
908 operating system
910 app
912 computer
914 operating system
916 application
918 application
920 server
922 operating system
924 service
926 service
928 interpreter
930 driver
932 driver
934 driver
936 driver
938 file
940 file
942 plug-in
1000 machine
1002 instructions
1004 processors
1006 memory
1008 I/O components
1010 bus
1012 processor
1014 processor
1016 main memory
1018 static memory
1020 storage unit
1022 machine-readable medium
1024 output components
1026 input components
1028 biometric components
1030 motion components
1032 environmental components
1034 position components
1036 communication components
1038 network
1040 devices
1042 coupling
1044 coupling "Algorithm" refers to any set of instructions configured to cause a machine to carry out a particular function or process.

"App" refers to a type of application with limited functionality, most commonly associated with applications executed on mobile devices. Apps tend to have a more limited feature set and simpler user interface than applications as those terms are commonly understood in the art.

"Application" refers to any software that is executed on a device above a level of the operating system. An application will typically be loaded by the operating system for execution and will make function calls to the operating system for lower-level services. An application often has a user interface but this is not always the case. Therefore, the term 'application' includes background processes that execute at a higher level than the operating system.

"Application program interface" refers to instructions implementing entry points and return values to a module.

"Arbitrator" refers to logic that manages contention for a shared computing, communication, or memory resource in a computer system.

"Assembly code" refers to a low-level source code language comprising a strong correspondence between the source code statements and machine language instructions. Assembly code is converted into executable code by an assembler. The conversion process is referred to as assembly. Assembly language usually has one statement per machine language instruction, but comments and statements that are assembler directives, macros, and symbolic labels may also be supported.

"Cadence rule" refers to a logic setting that controls a rate and/or frequency of connection establishment and data transfers between disparate computer server systems.

"Compiled computer code" refers to object code or executable code derived by executing a source code compiler and/or subsequent tools such as a linker or loader.

"Compiler" refers to logic that transforms source code from a high-level programming language into object code or in some cases, into executable code.

"Computer code" refers to any of source code, object code, or executable code.

"Computer code section" refers to one or more instructions.

"Computer program" refers to another term for 'application' or 'app'.

"Connection cadence" refers to the rate and/or frequency of connection establishment for data transfers between disparate computer server systems.

"Connection scheduler" refers to logic that establishes connections between disparate computer server systems according to a connection cadence determined by cadence rules.

"Daemon" refers to logic that executes without a user interface and which performs a background function in a computer system.

"De-coupling boundary" refers to an interface between two communicating logic components that decouples the rate at which one component transforms its inputs to outputs from the rate at which the other component transforms its inputs to outputs.

"Disparate computer server systems" refers to physically distinct and separate computer systems operated by distinct and separate companies and accessible over distinct and separate communication channels from one another.

"Driver" refers to low-level logic, typically software, that controls components of a device. Drivers often control the interface between an operating system or application and input/output components or peripherals of a device, for example.

"Engine" refers to logic that transforms inputs into outputs with adjustable performance. Engine logic may "idle" if no inputs are available for transformation.

"Executable" refers to a file comprising executable code. If the executable code is not interpreted computer code, a loader is typically used to load the executable for execution by a programmable device.

"Executable code" refers to instructions in a ready-to-execute form by a programmable device. For example, source code instructions in non-interpreted execution environments are not executable code because they must usually first undergo compilation, linking, and loading by the operating system before they have the proper form for execution. Interpreted computer code may be considered executable code because it can be directly applied to a programmable device (an interpreter) for execution, even though the interpreter itself may further transform the interpreted computer code into machine language instructions.

"File" refers to a unitary package for storing, retrieving, and communicating data and/or instructions. A file is distinguished from other types of packaging by having associated management metadata utilized by the operating system to identify, characterize, and access the file.

"Hot connection module" refers to logic that maintains a communication session open across configured timeout conditions.

"Indexing module" refers to logic that transforms received data signals into a searchable index.

"Ingest module" refers to logic that opens and operates communication sessions to pull data from disparate computer server systems.

"Instructions" refers to symbols representing commands for execution by a device using a processor, microprocessor, controller, interpreter, or other programmable logic. Broadly, 'instructions' can mean source code, object code, and executable code. 'instructions' herein is also meant to include commands embodied in programmable read-only memories (EPROM) or hard coded into hardware (e.g., 'micro-code') and like implementations wherein the instructions are configured into a machine memory or other hardware component at manufacturing time of a device.

"Interpreted computer code" refers to instructions in a form suitable for execution by an interpreter.

"Interpreter" refers to an interpreter is logic that directly executes instructions written in a source code scripting language, without requiring the instructions to a priori be compiled into machine language. An interpreter translates the instructions into another form, for example into machine language, or into calls to internal functions and/or calls to functions in other software modules.

"Library" refers to a collection of modules organized such that the functionality of all the modules may be included for use by software using references to the library in source code.

"Linker" refers to logic that inputs one or more object code files generated by a compiler or an assembler and combines them into a single executable, library, or other unified object code output. One implementation of a linker directs its output directly to machine memory as executable code (performing the function of a loader as well).

"Loader" refers to logic for loading programs and libraries. The loader is typically implemented by the operating system. A typical loader copies an executable into memory and prepares it for execution by performing certain transformations, such as on memory addresses.

"Logic" refers to any set of one or more components configured to implement functionality in a machine. Logic includes machine memories configured with instructions that when executed by a machine processor cause the machine to carry out specified functionality; discrete or integrated circuits configured to carry out the specified functionality; and machine/device/computer storage media configured with instructions that when executed by a machine processor cause the machine to carry out specified functionality. Logic specifically excludes software per se, signal media, and transmission media.

"Machine language" refers to instructions in a form that is directly executable by a programmable device without further translation by a compiler, interpreter, or assembler. In digital devices, machine language instructions are typically sequences of ones and zeros.

"Metadata control settings" refers to settings that control the establishment of secure connections between disparate computer server systems.

"Module" refers to a computer code section having defined entry and exit points. Examples of modules are any software comprising an application program interface, drivers, libraries, functions, and subroutines.

"Normalizing module" refers to logic that transforms data received from disparate computer server systems in various and different formats into a common format.

"Object code" refers to the computer code output by a compiler or as an intermediate output of an interpreter. Object code often takes the form of machine language or an intermediate language such as register transfer language (RTL).

"Operating system" refers to logic, typically software, that supports a device's basic functions, such as scheduling tasks, managing files, executing applications, and interacting with peripheral devices. In normal parlance, an application is said to execute "above" the operating system, meaning that the operating system is necessary in order to load and execute the application and the application relies on modules of the operating system in most cases, not vice-versa. The operating system also typically intermediates between applications and drivers. Drivers are said to execute "below" the operating system because they intermediate between the operating system and hardware components or peripheral devices.

"Outflow engine" refers to engine logic utilized by the outflow module.

"Outflow module" refers to logic that services on-demand or scheduled requests for structured data for utilization by client apps and applications to generate structured user interfaces and graphical visualizations.

"Plug-in" refers to software that adds features to an existing computer program without rebuilding (e.g., changing or re-compiling) the computer program. Plug-ins are commonly used for example with Internet browser applications.

"Process" refers to software that is in the process of being executed on a device.

"Programmable device" refers to any logic (including hardware and software logic) who's operational behavior is configurable with instructions.

"Pushing" refers to implementing a data transfer over a link or across a boundary independently of receiving a request or trigger for the data transfer from the target of the data transfer.

"Serverless" refers to a computing system architected such that performance scalability is enabled by configuring, either automatically or via manually configured control settings, units of resource consumption (e.g., computational units, communication bandwidth, memory) rather than by adding or removing entire computer servers.

"Service" refers to a process configurable with one or more associated policies for use of the process. Services are commonly invoked on server devices by client devices, usually over a machine communication network such as the Internet. Many instances of a service may execute as different processes, each configured with a different or the same policies, each for a different client.

"Software" refers to logic implemented as instructions for controlling a programmable device or component of a device (e.g., a programmable processor, controller). software can be source code, object code, executable code, machine language code. Unless otherwise indicated by context, software shall be understood to mean the embodiment of said code in a machine memory or hardware component, including "firmware" and micro-code.

"Source code" refers to a high-level textual computer language that requires either interpretation or compilation in order to be executed by a device.

"Subroutine" refers to a module configured to perform one or more calculations or other processes. In some contexts the term 'subroutine' refers to a module that does not return a value to the logic that invokes it, whereas a 'function' returns a value. However herein the term 'subroutine' is used synonymously with 'function'.

"Tag" refers to a label associated with a filter condition. An example of a filter condition is a Structured Query Language or Boolean logic setting. An example of a tag (the format is just an example) is: September Large Transactions→"amount >$100 AND 9/1/2019←date←9/30/2019"

"Task" refers to one or more operations that a process performs.

"User" refers to a human operator of a client device.

"User override" refers to a control setting by a user that preempts or replaces a system setting.

"Web application" refers to an application or app that is stored on a remote server and delivered over the Internet through a browser interface.

"Web integration service" refers to a container for a web service, providing an API between the web service and external logic.

"Web service" refers to a service that listens for requests (typically at a particular network port) and provides functionality (e.g., Javascript, algorithms, procedures) and/or data (e.g., HTML, JSON, XML) in response to the requests.

Various functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, claims in this application that do not otherwise include the "means for" [performing a function] construct should not be interpreted under 35 U.S.C § 112(f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

Having thus described illustrative embodiments in detail, it will be apparent that modifications and variations are possible without departing from the scope of the invention as claimed. The scope of inventive subject matter is not limited to the depicted embodiments but is rather set forth in the following Claims.

What is claimed is:

1. A distributed data communication and transformation system comprising:
   at least one data processor; and
   a machine memory comprising instructions that, when applied to and executed by the at least one data processor, result in the system:
   operating an ingest module on a first side of a de-coupling boundary, the ingest module comprising:
   a web integration service interfaced to receive data signals from a plurality of disparate computer systems; and
   a normalizing module configured to combine and transform the data signals from the web integration service into a normalized data set, the normalizing module configured to associate specific records of the normalized data with anchor tag parameters derived from queries generated from a web application;
   operating an outflow module on a second side of the de-coupling boundary, the outflow module comprising:
   an indexing module configured to transform the normalized data set into a search index, the indexing module operative asynchronously from the normalizing module and the web integration service across the de-coupling boundary;
   an outflow engine dynamically configurable from the second side of the de-coupling boundary to filter outputs of the search index without signaling across the de-coupling boundary; and wherein a push notification is applied across the decoupling boundary to trigger the indexing module to update the search index with the normalized data set.

2. The system of claim 1, wherein the instructions, when applied to and executed by the at least one data processor, further result in:
the ingest module pushing the outputs of the normalizing module across the de-coupling boundary.

3. The system of claim 1, the ingest module further comprising:
a hot connection module responsive to a plurality of metadata control settings for disparate computer server systems, the control settings implementing cadence rules for connection to and data transfer from the disparate computer server systems.

4. The system of claim 3, wherein the instructions, when applied to and executed by the at least one data processor, further result in:
the hot connection module executing a connection cadence on each of the disparate computer server systems based on the cadence rules.

5. The system of claim 1, the normalizing module comprising a plurality of data transformation algorithms to apply to outputs of the web integration service.

6. The system of claim 1, wherein the instructions, when applied to and executed by the at least one data processor, further result in:
the outflow module operating on the outputs of the search index based on a hierarchical transaction grouping control structure configurable from the mobile application.

7. The system of claim 1, wherein the instructions, when applied to and executed by the at least one data processor, further result in:
the outflow engine responding to search parameters generated from a web application to the second side of the de-coupling boundary.

8. The system of claim 7, wherein the instructions, when applied to and executed by the at least one data processor, further result in:
combining the search parameters with a hierarchical transaction grouping control structure configurable from a mobile application to generate search results returned from the outflow engine to the web application.

9. The system of claim 1, wherein the ingest module and the outflow module are serverless.

10. A distributed data communication and transformation system comprising:
at least one data processor; and
a machine memory comprising instructions that, when applied to and executed by the at least one data processor, result in the system:
operating an ingest module operative on a first side of a de-coupling boundary, the indexing module comprising a hot connection module configured with cadence rules for a plurality of disparate computer server systems, the ingest module generating a normalized data set from data signals received from the hot connection module;
operating an outflow module operative on a second side of the de-coupling boundary, the outflow module comprising:
an indexing module operative asynchronously from operation of the ingest module across the de-coupling boundary to transform outputs of the hot connection module into a search index;
an outflow engine dynamically configurable from the second side of the de-coupling boundary to apply onto transaction records referenced in the index a hierarchical transaction grouping control structure configurable from a mobile application independently of a search query session, the hierarchical transaction grouping control structure comprising one or more inheritance tag relationships and one or more container tag relationships; and
wherein a notification communicated across the decoupling boundary triggers the indexing module to update the search index according to bins formed in the normalized data set based on anchor tag parameters generated from queries applied to the search index.

11. The system of claim 10, wherein the instructions, when applied to and executed by the at least one data processor, further result in:
the ingest module asynchronously pushier outputs of the hot connection module across the de-coupling boundary.

12. The system of claim 10, wherein the instructions, when applied to and executed by the at least one data processor, further result in:
controlling the hot connection module with settings implementing cadence rules for connection to and data transfer from disparate computer server systems.

13. The system of claim 10, wherein the instructions, when applied to and executed by the at least one data processor, further result in:
the outflow engine responding to search parameters generated from a web application to the second side of the de-coupling boundary.

14. A method of operating a distributed computer system, the method comprising:
operating an ingest module on a first side of a de-coupling boundary to normalize outputs of a hot connection module and to associate the outputs of the hot connection module with anchor tags derived from queries to a search index, wherein each of the anchor tags comprises at least one anchor tag parameter;
processing the normalized outputs with an indexing module operated asynchronously from the ingest module on a second side of the de-coupling boundary to generate the search index, wherein a push notification is applied across the decoupling boundary to trigger the indexing module to update the search index based on the anchor tag parameters in the normalized outputs; and
operating a mobile application to apply onto transaction records referenced in the search index a hierarchical transaction grouping control structure comprising the anchor tags, independently of search query sessions on the search index, the hierarchical transaction grouping control structure comprising one or more inheritance tag relationships and one or more container tag relationships.

15. The method of claim 14, further comprising:
pushing the normalized outputs across the de-coupling boundary.

16. The method of claim 14, further comprising:
configuring the hot connection module with metadata control settings for disparate computer server systems, the control settings implementing cadence rules for connection to and data transfer from the disparate computer server systems.

17. The method of claim 16, further comprising:
operating the hot connection module to execute a connection cadence on each of the disparate computer server systems based on the cadence rules.

18. The method of claim 14, further comprising a plurality of data transformation algorithms to apply to output of the hot connection module.

19. The method of claim 14, the hierarchical transaction grouping control structure comprising one or more exclusion tags.

20. The system of claim 14, wherein the ingest module and the outflow module are serverless.

\* \* \* \* \*